(12) United States Patent
Sikora

(10) Patent No.: US 9,789,892 B1
(45) Date of Patent: Oct. 17, 2017

(54) WHEELBARROW

(71) Applicant: Zbynek Sikora, Buford, GA (US)

(72) Inventor: Zbynek Sikora, Buford, GA (US)

(*) Notice: Subject to any disclaimer, the term of this patent is extended or adjusted under 35 U.S.C. 154(b) by 0 days.

(21) Appl. No.: 15/263,187

(22) Filed: Sep. 12, 2016

(51) Int. Cl.
*B62B 1/18* (2006.01)
*B62B 1/20* (2006.01)
*B62B 1/22* (2006.01)
*B62B 1/24* (2006.01)
*B62B 3/12* (2006.01)
*B62B 3/00* (2006.01)

(52) U.S. Cl.
CPC ............... *B62B 3/12* (2013.01); *B62B 3/001* (2013.01)

(58) Field of Classification Search
CPC .... B62B 1/18; B62B 1/20; B62B 1/22; B62B 1/24; B62B 1/186; B62B 1/204; B62B 1/208; B62B 1/202
See application file for complete search history.

(56) References Cited

U.S. PATENT DOCUMENTS

| 2,504,907 | A | * | 4/1950 | Truran | B62B 1/20 280/47.18 |
| 3,085,815 | A | * | 4/1963 | Dougherty | B62B 1/208 220/9.3 |
| 4,962,833 | A | * | 10/1990 | McCurdy | B62B 5/068 188/114 |

* cited by examiner

*Primary Examiner* — Bryan Evans
(74) *Attorney, Agent, or Firm* — Incorporating Innovation LLC; Charlena Thorpe, Esq.

(57) ABSTRACT

Implementations of a wheelbarrow are provided. In some implementations, the wheelbarrow comprises a receptacle, a front wheel having an axle extending therethrough, a frame, handles, and a self balancer operatively connected to the frame. In some implementations, the front end, back end, first side, second side, and bottom of the receptacle are curved. In some implementations, the frame includes a first tube and second tube. In some implementations, each of the first tube and the second has a first portion that is concave and extends along the bottom and back end of the receptacle, a second portion that extends from the first portion towards the wheel and is convex, and a third portion that extends from the second portion toward the axle and is straight. In some implementations, the distal end of the third portion of the first tube and the second is operatively connected to the axle. In some implementations, the self balancer is configured so that the receptacle does not make contact with a surface when the wheel and the self balancer are in contact with the surface.

18 Claims, 3 Drawing Sheets

WHEELBARROW

TECHNICAL FIELD

This disclosure relates to implementations of a wheelbarrow.

BACKGROUND

The basic design of the wheelbarrow has not changed over time. However, the existing basic design has several functional problems. For example, the center of gravity in existing wheelbarrows is relatively high. The high center of gravity causes existing wheelbarrows to tip over easily. Furthermore, existing wheelbarrows are relatively unstable during transport and unloading.

U.S. Pat. No. 7,950,687 discloses a wheelbarrow that does not have any legs beneath the frame. Thus, when the wheelbarrow in the '687 patent is not moving, the frame is placed directly on the ground. The '687 patent discloses that this no legs feature reduces work for the user, reduces strainer on the user's back, almost eliminates risk that the wheelbarrow will tip over during filling, and stabilizes the wheelbarrow while filling the bucket. The '687 patent also discloses that the frame extends along a significant amount of the front of the bucket thereby placing the front of the frame above the wheels and axles. Side plates are used to support the axle.

DETAILED DESCRIPTION

Figure 1A:
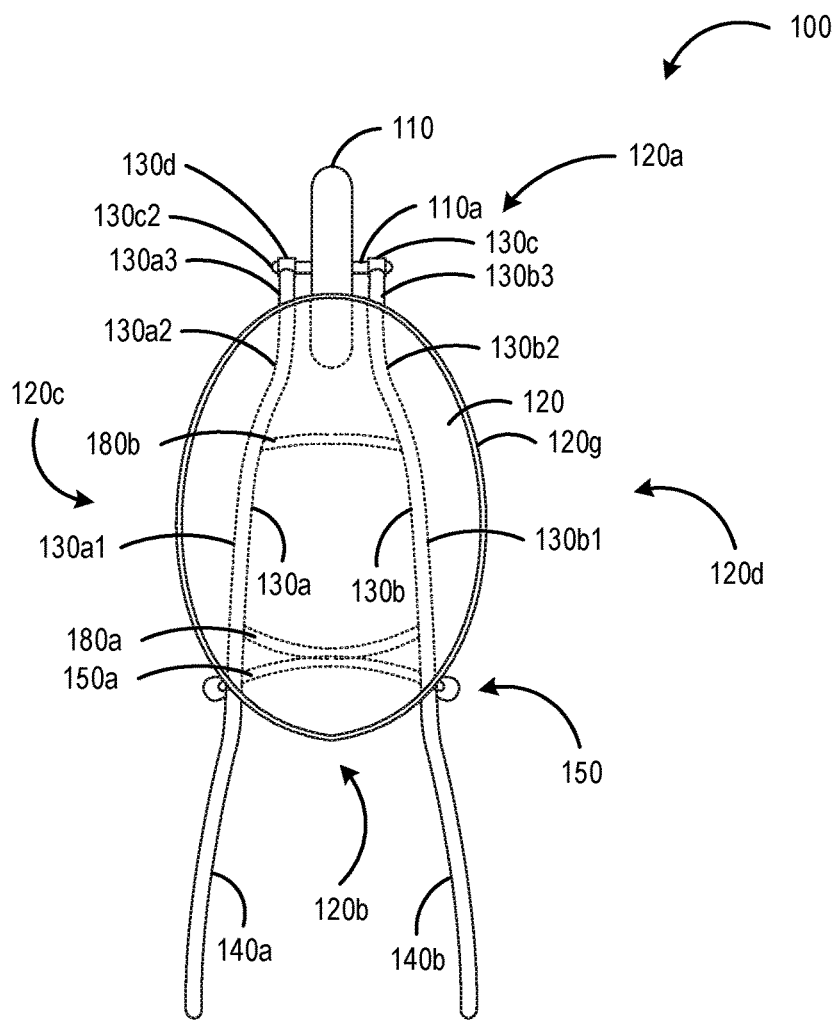
FIGS. 1A-1D illustrate an example implementation of a top view, front view, side view and rear view, respectively, of a wheelbarrow according to the principles of the present inventions.
Figure 1B:
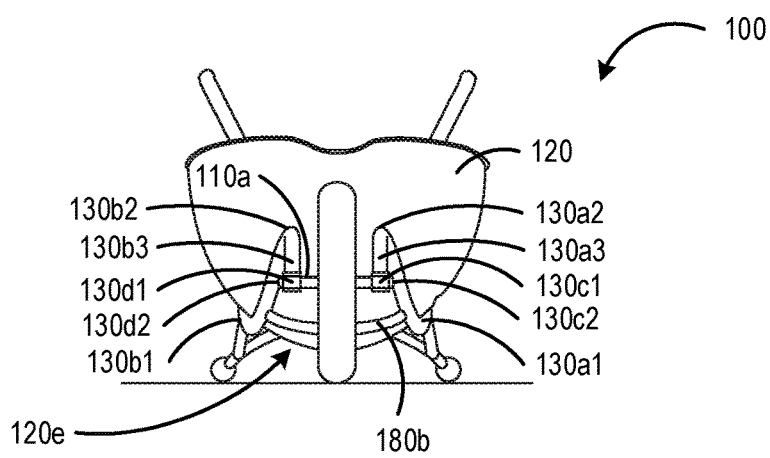

Implementations of a wheelbarrow are provided. In some implementations, the wheelbarrow comprises a receptacle, a front wheel having an axle extending therethrough, a frame, handles, and a self balancer operatively connected to the frame. In some implementations, the front end, back end, first side, second side, and bottom of the receptacle are curved. In some implementations, the frame includes a first tube and second tube. In some implementations, each of the first tube and the second has a first portion that is concave and extends along the bottom and back end of the receptacle, a second portion that extends from the first portion towards the wheel and is convex, and a third portion that extends from the second portion toward the axle and is straight. In some implementations, the distal end of the third portion of the first tube and the second is operatively connected to the axle. In some implementations, the self balancer is configured so that the receptacle does not make contact with a surface when the wheel and the self balancer are in contact with the surface.

FIGS. 1A-1D illustrate an example implementation of a top view, front view, side view and rear view of a wheelbarrow 100, respectively, according to the principles of the present inventions.

The wheelbarrow 100 comprising a front wheel 110 having an axle 110a extending therethrough, a receptacle 120, a frame 130 having a first tube 130a and second tube 130b, a first handle 140a connected to the first tube 130a, and a second handle 140b connected to the second tube 130b.

In some implementations, the handles 140a, 140b are integral with the first tube 130a and second tube 130b, respectively.

Figure 2:
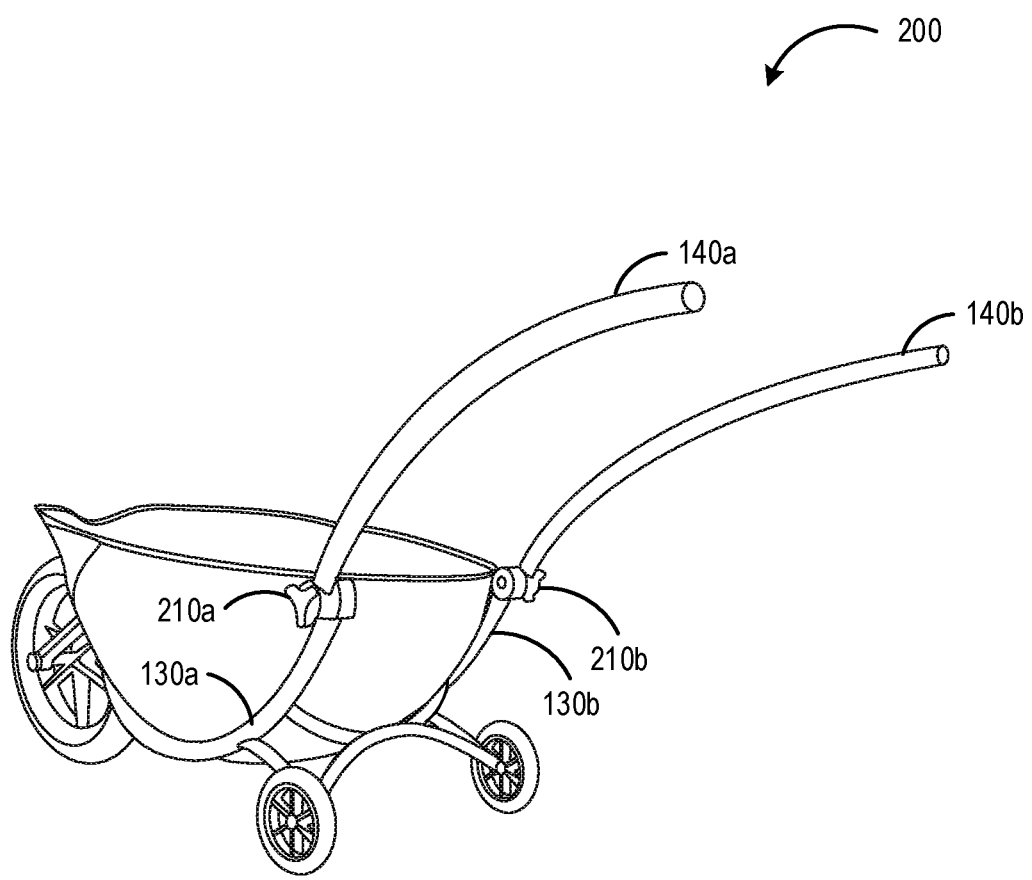
FIG. 2. illustrates another example implementation of a wheelbarrow according to the principles of the present inventions.

As shown in FIG. 2, in some implementations, the handles 140a, 140b may be attached to the tubes 130a, 130b via an adjuster 210a, 120b, respectively, configured to rotate the handles 140a, 140b to change the height of the handles 140a, 140b from the ground.

In some implementations, the handles 140a, 140b can extend inside of the tubes 130a, 130b respectively to adjust the length of the handles.

In some implementations, the receptacle 120 may have a front end 120a, back end 120b on an opposing end of the front end 120a, a first side 120c, a second side 120d on an opposing side of the first side 120c, and a bottom 120e forming an open enclosure 120f.

In some implementations, the front end 120a and the second end 120b each extends from the first side 120c to the second side 120d and from a top rim (i.e., outer edge) 120g to the bottom 120e.

In some implementations, the first side 120c and second side 120d each extends from the front end 120a to the back end 120b and from the top rim 120g to the bottom 120e.

In some implementations, the bottom 120e extends from the front end 120a to the back end 120b and from the first side 120c to the second side 120d.

In some implementations, the receptacle 120 may be a round container that is open at the top. That is, in some implementations, the surfaces forming the front end 120a, back end 120b, first side 120c, second side 120d, and bottom 120e are configured to form a round container that is open at the top.

In some implementations, the receptacle 120 may have a concave shape with an open top. That is, in some implementations, the surfaces forming the front end 120a, back end 120b, first side 120c, second side 120d, and bottom 120e are configured to form a concave shape with an open top.

In some implementations, the receptacle 120 may have curved sides 120c, 120d and a curved bottom 120e forming a receptacle having an open top. In some implementations, the receptacle 120 may have a curved front end 120a. In some implementations, the receptacle 120 may have a curved back end 120b.

In some implementations, the rim 120g formed by the front end 120a, back end 120b, first side 120c, and second side 120d of the receptacle 120 is oblong. In some implementations, the rim 120g formed by the front end 120a, back end 120b, first side 120c, and second side 120d of the receptacle 120 is oval. In some implementations, the rim 120g formed by the front end 120a, back end 120b, first side 120c, and second side 120d of the receptacle 120 is egg-shaped.

In some implementations, the rim 120g formed by the front end 120a, back end 120b, first side 120c, and second side 120d of the receptacle 120 is curved on the front end 120a, back end 120b, first side 120c, and second side 120d.

In some implementations, the curved formed by the rim 120g is sharper on one end than the other end in a lengthwise direction. In some implementations, the curved formed by the rim 120g is sharper on the back end 120b than the front end 120a. In some implementations, the curved formed by the rim 120g is sharper on the front end 120a than the back end 120b.

In some implementations, the receptacle 120 is wider on one end than the other end in a lengthwise direction. In some implementations, the receptacle 120 is wider on the front end 120a than the back end 120b. In some implementations, the receptacle 120 is wider on the back end 120b than the front end 120a.

In some implementations, the front wheel 110 is positioned adjacent the first end 120a of the receptacle 120. In some implementations, a portion of the first end 120a of the receptacle 120 may extend above the wheel 110.

In some implementations, a portion 130a1 of the first tube 130a is curved and extends along the bottom and back of the receptacle 120. In some implementations, the portion 130a1 of the first tube 130a extending along the bottom and back of the receptacle 120 is concave.

Similarly, in some implementations, a portion 130b1 of the second tube 130b is curved and extends along the bottom and back of the receptacle 120. In some implementations, the portion 130b1 of the second tube 130b extending along the bottom and back of the receptacle 120 is concave.

Figure 1C:
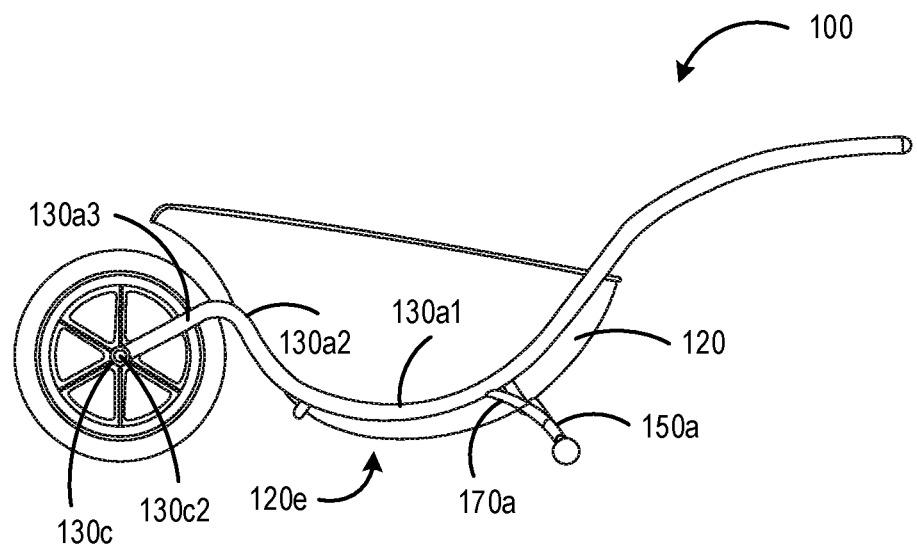
Figure 1D:
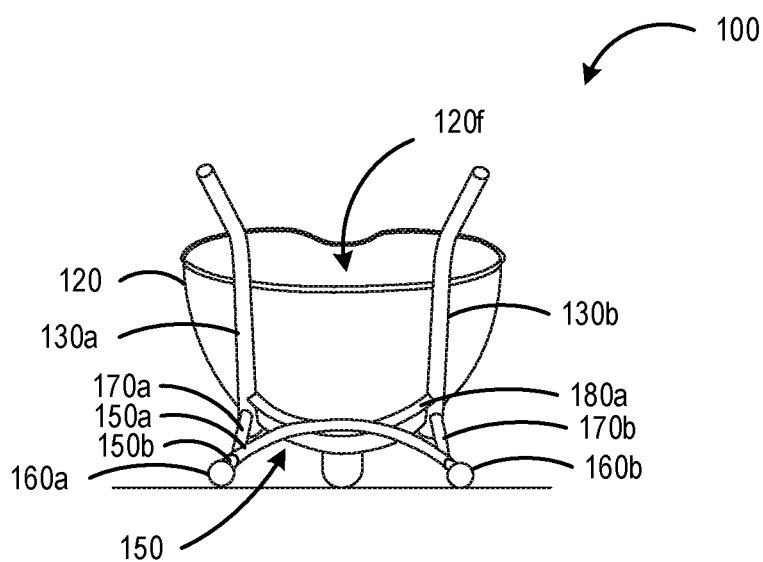

In some implementations, the first tube 130a and second tube 130b are positioned such that when the receptacle 120 rests on the frame 130, a portion of the bottom 120e of the receptacle 120 is positioned below the portion 130a1, 130b1 of the first tube 130a and second tube 130b, respectively as shown in FIG. 1C.

In some implementations, a portion 130a2 of the first tube 130a is convex and a straight portion 130a3 extends for the convex portion 130a2. Similarly, in some implementations, a portion 130b2 of the second tube 130b is convex and a straight portion 130b3 extends for the convex portion 130b2.

In some implementations, the distal end of the straight portion 130a3 of the first tube 130a is operatively connected to one end of the axle 110a and the distal end of the straight portion 130b3 of the second tube 130b is operatively connected to the other end of the axle 110a.

In some implementations, the distal end of the straight portion 130a3 of the first tube 130a may include a hollow enclosure 130c for the axle 110 to extend though. In some implementations, the hollow enclosure 130c may include a cut-out 130c1. In some implementations, the width of the cutout is at least the diameter of the axle 110a to enable the axle 110a to be inserted into the hollow enclosure 130c. Because of the cut-out 130c1, in some implementations, the wheelbarrow 100 may further comprise a cap 130c2 configured to be inserted into hollow enclosure to cover the cut-out 130c1 and prevent the axle 110a from slipping out of the enclosure 130c. In some implementations the cap 130c2 includes a hollow enclosure to receive the axle.

Similarly, in some implementations, the distal end of the straight portion 130b3 of the second tube 130b may include a hollow enclosure 130d for the axle 110 to extend though. In some implementations, the hollow enclosure 130d may include a cut-out 130d1. In some implementations, the width of the cutout is at least the diameter of the axle 110a to enable the axle 110a to be inserted into the hollow enclosure 130d. Because of the cut-out 130d1, in some implementations, the wheelbarrow 100 may further comprise a cap 130d2 configured to be inserted into hollow enclosure 130d to cover the cut-out 130d1 and prevent the axle 110a from slipping out of the enclosure 130d. In some implementations the cap 130d2 includes a hollow enclosure to receive the axle.

In some implementations, the wheelbarrow 100 further comprises a self balancer 150 operatively connected to the frame 130 and extending beneath the frame. In some implementations, the wheelbarrow 100 is configured to rest on the self balancer and front wheel 110 when the wheelbarrow 100 is not in use.

In some implementations, the self balancer 150 comprises a hollow outer tube 150a and an inner tube 150b that extends through the outer tube 150a. In some implementations, the inner tube 150b is configured to slide along the inside of the outer tube 150a. In some implementations, the outer tube 150a and an inner tube 150b are curved. In some implementations, the outer tube 150a and an inner tube 150b are convex.

In some implementations, the ends of the inner tube 150b are connected to balls 160a, 160b on which the wheelbarrow 100 rests. In some implementations, the balls 160a, 160b are round. In some implementations, the balls 160a, 160b can be any suitable shape. In some implementations, the balls 160a, 160b may be replaced with wheels.

In some implementations, the self balancer 150 is positioned near the back end 120b of the receptacle 120 opposite the first end 120a of the receptacle.

In some implementations, the wheelbarrow 100 is configured so that the receptacle 120 does not make contact with a floor or ground when the wheel 110 and the balls 160a, 160b are in contact with the floor or ground.

In some implementations, the outer tube 150a is operatively connected to the first tube 130a and the second tube 130b of the frame 130.

In some implementations, a first connector tube 170a connects the first tube 130a and the outer tube 150a. In some implementations, a second connector tube 170b connects the second tube 130b and the outer tube 150a.

In some implementations, the first connector tube 170a and the second connector tube 170b are curved. In some implementations, the first connector tube 170a and the second connector tube 170b are convex.

In some implementations, the first connector tube 170a connects the first tube 130a to or near a first end of the outer tube 150a. In some implementations, the second connector tube 170b connects the second tube 130b to or near a second end of the outer tube 150a.

In some implementations, the wheelbarrow 100 further comprises a first cross bar 180a that extends from the first tube 130a to the second tube and connects to the outer tube 150a. In some implementations the first cross bar 180a is curved. In some implementations the first cross bar 180a is concave. In some implementations, the first cross bar 180a is positioned to extend along the back end 120a of the receptacle 120 in a widthwise direction.

In some implementations, the wheelbarrow 100 further comprises a second cross bar 180b that extends from the first tube 130a to the second tube. In some implementations, the second cross bar 180b is positioned near the front end 120a of the receptacle 120. In some implementations, the second cross bar 180b is positioned to extend along the bottom 120e of the receptacle 120 in a widthwise direction.

In some implementations, the self balancer 150 may be detachable from the frame 130 and/or first cross bar 180a. In some implementations, the self balancer 150 and first connector 170a and second connector 170b may be an integral piece that may be detachable from the wheelbarrow 100.

In use, when the ball on one end of the inner tube 150b is placed on an elevation and the wheelbarrow 110 is lowered, the inner tube 150b will extend from the outer tube 150a on the opposite end and the ball on the opposition end of the inner tube 150b will make contact with the elevated surface to balance the wheelbarrow 100.

In some implementations, the self balancer 150 may be configured such that the inner tube 150b will be positioned at a neutral position when there is no force applied to the self balancer 150. In some implementations, the self balancer 150 may be configured such that the inner tube 150b will be centered along the outer tube 150a when there is no force applied to the self balancer 150. In some implementations, the self balancer 150 may include an inner spring configured such that the inner tube 150b will be positioned at a neutral position when there is no force applied to the self balancer 150.

In some implementations, the tubes, connectors, and crossbars maybe manufactured from metal. In some implementations, the tubes, connectors, and crossbars maybe manufactured from any suitable material. In some implementations, the tubes, connectors, and crossbars may be hollow. In some implementations, the tubes, connectors, and crossbars may be solid. In some implementations, the balls 160a, 160b may be manufactured from rubber or any suitable material.

As shown in FIG. 2, in some implementations, the self balancer 150 may be replaced with a stationary unit. In other words, the wheelbarrow 100 comprises the outer tube 150a with wheels attached to both ends.

Reference throughout this specification to "an embodiment" or "implementation" or words of similar import means that a particular described feature, structure, or characteristic is included in at least one embodiment of the present invention. Thus, the phrase "in an embodiment" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

The invention claimed is:

1. A wheelbarrow comprising:
a receptacle wherein the receptacle has a front end, back end on an opposing end to the front end, a first side, a second side on an opposing side to the first side, and a bottom forming an open enclosure, wherein the front end, back end, first side, second side, and bottom are curved, and wherein the rim on the top of the receptacle formed by the front end, back end, first side, and second side is curved on the front end, back end, first side, and second side;
a front wheel having an axle extending therethrough wherein the front wheel is positioned adjacent the first end of the receptacle,
a frame having a first tube and second tube wherein:
the first tube has a first portion, a second portion, and a third portion, wherein the first portion is concave and extends along the bottom and back end of the receptacle; the second portion extends from the first portion towards the wheel and is convex; and the third portion extends from the second portion toward a first end of the axle and is straight, wherein the distal end of the third portion is operatively connected to the first end of the axle;
the second tube has a first portion, a second portion, and a third portion, wherein the first portion is concave and extends along the bottom and back end of the receptacle; the second portion extends from the first portion towards the wheel and is convex; and the third portion extends for the second portion towards the second end of the axle and is straight, wherein the distal end of the third portion is operatively connected to the second end of the axle;
a first handle connected to the first tube on an end of the first tube opposite the distal end of the third portion of the first tube, and
a second handle connected to the second tube on an end of the second tube opposite the distal end of the third portion of the second tube; and
a self balancer operatively connected to the frame and extending beneath the frame, wherein the self balancer comprises a hollow outer tube operatively connected to the frame and an inner tube that extends through the outer tube and configured to slide along the inside of the outer tube, wherein each end of the inner tube is connected to a circular end, wherein the outer tube and an inner tube are curved and convex, and wherein the self balancer is configured so that the receptacle does not make contact with a surface when the wheel and the circular ends of the inner tube are in contact with the surface.

2. The wheelbarrow of claim 1 wherein the rim is oblong.

3. The wheelbarrow of claim 1 wherein the rim is oval.

4. The wheelbarrow of claim 1 wherein the rim is egg-shaped.

5. The wheelbarrow of claim 1 wherein the rim is sharper on one end than on the other end in a lengthwise direction.

6. The wheelbarrow of claim 1 wherein the receptacle is wider on one end than on the other end in a lengthwise direction.

7. The wheelbarrow of claim 1 wherein the distal end of the third portion of the first tube and the second tube include a hollow enclosure for the first end and second end of the axle, respectively to extend though, wherein the hollow enclosure of the first tube and the second tube each includes a cut-out, wherein the width of the cutout is at least the diameter of the axle, the wheelbarrow further comprising a first cap and a second cap configured to be inserted into the hollow enclosure of the first tube and the second tube, respectively, to cover the cut-out of the hollow enclosure of the first tube and the second tube, respectively, and prevent the axle from slipping out of the hollow enclosure of the first tube and the second tube, respectively, wherein each of the first cap and second includes a hollow enclosure to receive the axle.

8. The wheelbarrow of claim 1 wherein the outer tube of the self balancer is operatively connected to the first tube and the second tube of the frame.

9. The wheelbarrow of claim 8 wherein a first connector tube connects the first tube and the outer tube and a second connector tube connects the second tube and the outer tube.

10. The wheelbarrow of claim 9 wherein the first connector tube and the second connector tube are convex.

11. The wheelbarrow of claim 10 wherein the first connector tube connects the first tube to a first end of the outer tube and the second connector tube connects the second tube to a second end of the outer tube.

12. The wheelbarrow of claim 1 further comprising a first cross bar that extends from the first tube to the second tube and connects to the outer tube wherein the first cross bar is concave and positioned to extend along the back end of the receptacle in a widthwise direction.

13. The wheelbarrow of claim 1 wherein the first handle and second handle are integral with the first tube and second tube, respectively.

14. The wheelbarrow of claim 1 wherein the surfaces forming the front end, back end, first side, second side, and bottom of the receptacle are configured to form a concave shape with an open top.

15. The wheelbarrow of claim 1 wherein each end of the inner tube of the self balancer is connected to wheels.

16. The wheelbarrow of claim 9 wherein the self balancer, first connector tube and second connector tube are an integral piece and detachable from the frame.

17. The wheelbarrow of claim 1 wherein the first tube 130a and second tube 130b are positioned such that when the receptacle rests on the frame, a portion of the bottom of the receptacle is positioned below a portion of the first portion of the first tube and below a portion of the first portion of the second tube.

18. An wheelbarrow comprising:
a receptacle wherein the receptacle has a front end, back end on an opposing end to the front end, a first side, a second side on an opposing side to the first side, and a bottom forming an open enclosure, wherein the front end, back end, first side, second side, and bottom are curved, and wherein the rim on the top of the receptacle formed by the front end, back end, first side, and second side is curved on the front end, back end, first side, and second side;
a front wheel having an axle extending therethrough wherein the front wheel is positioned adjacent the first end of the receptacle,
a frame having a first tube and second tube wherein:
the first tube has a first portion, a second portion, and a third portion, wherein the first portion is concave and extends along the bottom and back end of the receptacle; the second portion extends from the first portion towards the wheel and is convex; and the third portion extends from the second portion toward a first end of the axle and is straight, wherein the distal end of the third portion is operatively connected to the first end of the axle;
the second tube has a first portion, a second portion, and a third portion, wherein the first portion is concave and extends along the bottom and back end of the receptacle; the second portion extends from the first portion towards the wheel and is convex; and the third portion extends for the second portion towards the second end of the axle and is straight, wherein the distal end of the third portion is operatively connected to the second end of the axle;
a first handle connected to the first tube on an end of the first tube opposite the distal end of the third portion of the first tube, and
a second handle connected to the second tube on an end of the second tube opposite the distal end of the third portion of the second tube; and
a stationary unit operatively connected to the frame and extending beneath the frame, wherein the stationary unit comprises a outer tube operatively connected to the frame, wherein each end of the outer tube is connected to wheels, wherein the outer tube is curved and convex, and wherein the stationary unit is configured so that the receptacle does not make contact with a surface when the front wheel and the wheels of the outer tube are in contact with the surface.

\* \* \* \* \*